US007523417B2

(12) United States Patent
Hintermeister et al.

(10) Patent No.: US 7,523,417 B2
(45) Date of Patent: Apr. 21, 2009

(54) CHANGING DISPLAY OF DATA BASED ON A TIME-LAPSE WIDGET

(75) Inventors: Gregory Richard Hintermeister, Rochester, MN (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 10/992,445

(22) Filed: Nov. 18, 2004

(65) Prior Publication Data

US 2006/0150122 A1   Jul. 6, 2006

(51) Int. Cl.
  *G06F 3/048* (2006.01)
(52) U.S. Cl. .................................. 715/833; 715/804
(58) Field of Classification Search .................. 715/833, 715/804, 811, 764
  See application file for complete search history.

(56) References Cited

U.S. PATENT DOCUMENTS

| | | | | |
|---|---|---|---|---|
| 5,251,152 | A * | 10/1993 | Notess | 709/224 |
| 5,615,347 | A * | 3/1997 | Davis et al. | 715/833 |
| 6,487,604 | B1 * | 11/2002 | Rochford et al. | 709/238 |
| 6,792,399 | B1 * | 9/2004 | Phillips et al. | 705/36 R |
| 7,016,906 | B1 * | 3/2006 | Janzig et al. | 707/101 |
| 2002/0154173 | A1 * | 10/2002 | Etgen et al. | 345/833 |
| 2003/0182621 | A1 * | 9/2003 | Mazza et al. | 715/504 |
| 2005/0256797 | A1 * | 11/2005 | Tyulyaev | 705/37 |
| 2006/0036960 | A1 * | 2/2006 | Loui | 715/764 |
| 2006/0259394 | A1 * | 11/2006 | Cushing et al. | 705/37 |

OTHER PUBLICATIONS

Ping Plotter Technical Support, http://www.pingplotter.com/tutorial/TheInterfaceGraphs.html, pp. 1-4, date unknown, printed Apr. 14, 2004.

* cited by examiner

*Primary Examiner*—Stephen S Hong
*Assistant Examiner*—Omar Abdul-Ali
(74) *Attorney, Agent, or Firm*—Owen J. Gamon

(57) ABSTRACT

A method, apparatus, system, and signal-bearing medium that, in an embodiment, display a time-lapse widget having time indicators associated with times. In an embodiment, each of the time indicators represents a relative ranking of changes to data at the times, and the size of the time indicators are proportional to the ranking. The data associated with the time indicators is displayed in response to a slider moving over the time indicators. In various embodiments, the time indicators may be associated with a time prior to the current time, in which case the associated data is historical or after the current time, in which case the associated data is forecasted. In an embodiment, data that has been changed associated with the time indicator currently selected via the position of the slider is emphasized. A current value and a previous value for the data associated with the time indicator may be displayed, and the current value may be changed to the previous value. In an embodiment, sliders in multiple dialogs having related data are moved together, where movement of one of the sliders causes corresponding movement of the other sliders, and each of the sliders is at a time indicator associated with the same time. In this way, related data that changes over time may be more easily viewed.

23 Claims, 11 Drawing Sheets

TIME-LAPSE DATA OBJECT

| TIMESTAMP ⌐615 | PREV VALUE ⌐620 | CURR VALUE ⌐625 | USER ⌐630 | RANK ⌐635 | TYPE ⌐640 | RELATED ⌐645 | |
|---|---|---|---|---|---|---|---|
| | | | | | RESOURCE RESERVES | | 605 |
| 5/1/2004 | 94.127 | 77.892 | USER A | 0 | SYSTEM DISK POOL | RESOURCE RESERVES | 610 |
| 8/15/2004 | 4 | 3 | | | SECURITY LEVEL | | 612 |

CHANGING DISPLAY OF DATA BASED ON A TIME-LAPSE WIDGET

FIELD

This invention generally relates to graphical user interfaces for computer systems and more specifically relates to time-lapse scrolling of data in a graphical user interface.

BACKGROUND

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

One of the most important developments in making computers not only more powerful, but easier to use, was the development of sophisticated user interfaces. Early computer systems were programmed with a series of switches or buttons and provided little relevant feedback during the operation of the computer system. This type of interface proved cumbersome and, accordingly, increasingly more functional and interactive interfaces were developed to extend the functionality of computer systems.

One very popular user interface, that ultimately gained widespread adoption on many different computer systems, was the "command line interface." Using a command line interface, the user interacted with the computer system by typing a specific command on a keyboard to instruct the computer regarding the, desired operation to be performed. The command line interface was not intuitive, however, and still limited the use of computers to those who had the time and desire to learn a large number of relatively cryptic commands.

Recognizing the growing need for a more user-friendly interface, computer engineers and programmers developed the Graphical User Interface (GUI). A GUI uses visual representations of common items to allow a user to operate a computer system. In most GUI-based systems, various icons, symbols, menus, etc. are manipulated or activated by a computer user via a pointing device (e.g., a mouse, a trackball, or trackpad), which allows the user to give instructions to the computer. The movement of the pointing device is usually translated to the movement of an animated arrow or cursor, displayed on the computer screen. By moving the mouse or other pointing device, the user can position the cursor at various locations on the computer screen. Then, by activating a button on the mouse, the user can invoke various commands and options.

The various graphical elements of a GUI are usually designed to be somewhat consistent and self-explanatory, thereby making it as easy as possible for a typical user to perform common computer system functions. Over a period of several years, many visual components of GUI-based systems have become fairly standardized and most graphical interfaces have specific elements which have become somewhat universal. For example, almost all GUI-based systems employ pull-down menus, scroll bars, button bars, and windows.

One use of these GUI elements is for the display of data that changes over time. A common way to display data that changes over time is a line chart, with time on a horizontal axis and the numeric values of the points of data on a vertical axis, so that different heights of the lines in the chart correspond to different numeric values of the data. For example, CPU or disk utilization in a computer system over time is commonly displayed in a line chart. Unfortunately, with multiple data points (e.g., both CPU and disk utilization displayed on the same chart), each data point having its own line, the line chart quickly becomes cluttered. Various techniques have been attempted to deal with this problem, such as giving each data point its own color or its own line format, such as a solid line versus a dotted line versus a dashed line. But as more data points are added, these techniques quickly lose their effectiveness.

To further exacerbate these problems, some data that changes over time is not so easily distilled to a simple numeric value for display on a line chart. For example, over time, a user may add, delete, and rename directories, sub-directories, and files in a file system. Or, a system administrator may, over time, add or change clients, servers, and routers in a network topology. Representing these kinds of data with a simple line chart showing numeric values changing over time does not provide nearly enough information to capture the complex nature and relationships of the changing data.

Thus, without a better to way to illustrate how data changes over time, users will continue to be frustrated in understanding and interpreting their data.

SUMMARY

A method, apparatus, system, and signal-bearing medium are provided that, in an embodiment, display a time-lapse widget having time indicators associated with times. In an embodiment, each of the time indicators represents a relative ranking of changes to data at the times, and the size of the time indicators are proportional to the ranking. The data associated with the time indicators is displayed and changed in response to a slider moving over the time indicators. In various embodiments, the time indicators may be associated with a time prior to the current time, in which case the associated data is historical, or after the current time, in which case the associated data is forecasted. In an embodiment, data that has been changed associated with the time indicator currently selected via the position of the slider is emphasized. A current value and a previous value for the data associated with the time indicator may be displayed, and the current value may be changed to the previous value. In an embodiment, sliders in multiple dialogs having related data are moved together, where movement of one of the sliders causes corresponding movement of the other sliders, and each of the sliders is at a time indicator associated with the same time. In this way, related data that changes over time may be more easily viewed.

BRIEF DESCRIPTION OF THE DRAWINGS

Various embodiments of the present invention are hereinafter described in conjunction with the appended drawings:

FIG. 6 depicts a block diagram of an example data structure for a time-lapse data object, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

In an embodiment, a dialog displays a time-lapse widget having time indicators associated with times. Each of the time indicators may represent a relative ranking of changes to data at the times, and the size of the time indicators are proportional to the ranking if present. The data associated with the time indicators is displayed and changed in response to a slider moving over the time indicators in the time-lapse widget. In various embodiments, the time indicators may be associated with a time prior to the current time, in which case the associated data is historical, or after the current time, in which case the associated data is forecasted. In an embodiment, data that has been changed associated with the time indicator currently selected via the position of the slider is emphasized. A current value and a previous value for the data associated with the time indicator may be displayed, and the current value may be changed to the previous value. In an embodiment, sliders in multiple dialogs having related data are moved together, where movement of one of the sliders causes corresponding movement of the other sliders, and each of the sliders is at a time indicator associated with the same time. In this way, data that changes over time may be more easily viewed.

Figure 1:
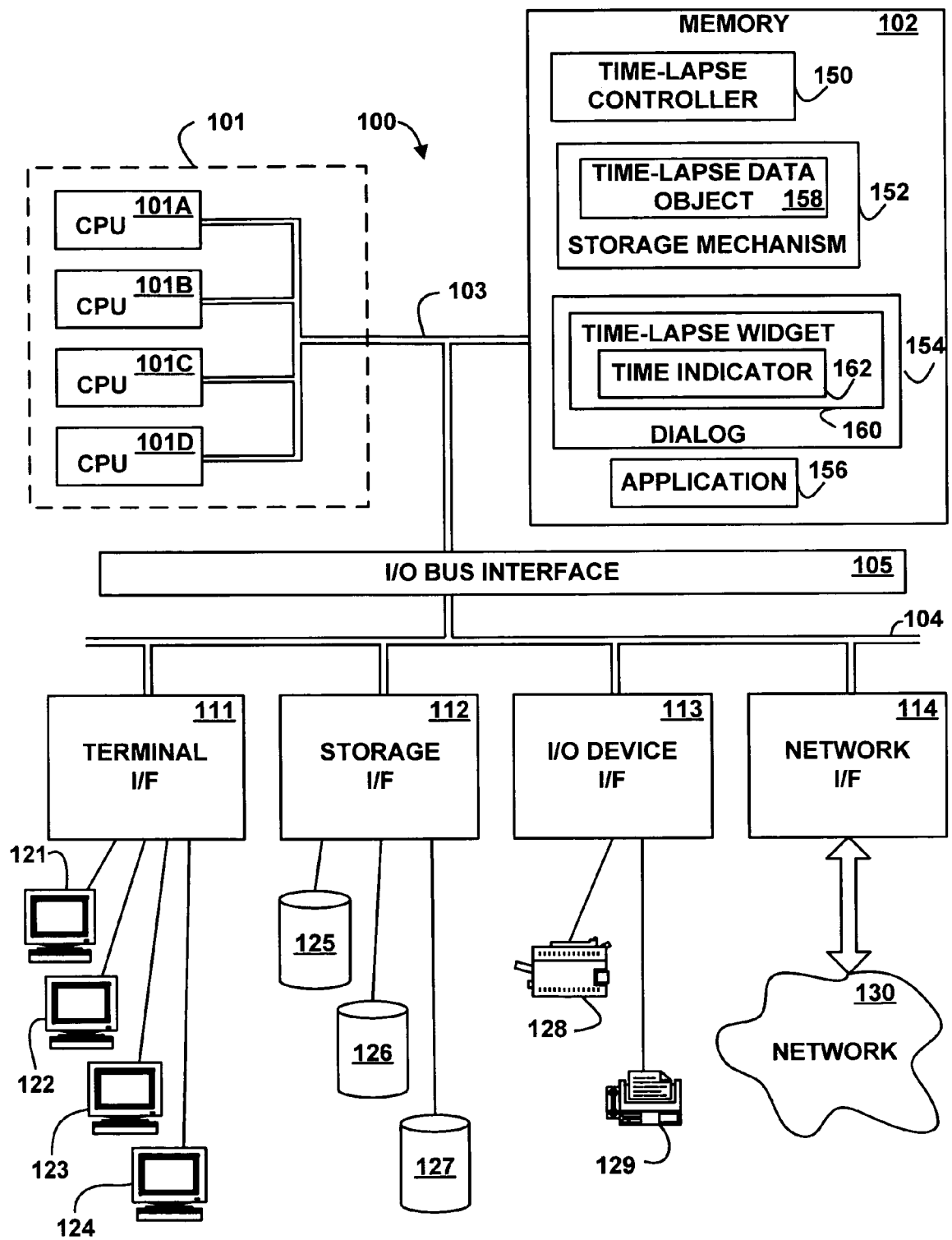
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. In an embodiment, the hardware components of the computer system 100 may be implemented by an IBM eServer iSeries computer system. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 includes a time-lapse controller 150, a storage mechanism 152, a dialog 154, and an application 156. Although the time-lapse controller 150, the storage mechanism 152, the dialog 154, and the application 156 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the time-lapse controller 150, the storage mechanism 152, the dialog 154, and the application 156 are illustrated as being contained within the main memory 102, these elements are not necessarily all completely contained in the same storage device at the same time.

Further, although the time-lapse controller 150, the storage mechanism 152, the dialog 154, and the application 156 are illustrated as being separate entities, in other embodiments some of them, or portions of some of them, may be packaged together. For example, in various embodiments, the time lapse controller 150 and the storage mechanism 152 may be packaged together and/or the dialog 154 and the application 156 may be packaged together.

The storage mechanism 152 includes a time-lapse data object 158, and the dialog 154 includes a time-lapse widget 160. The time-lapse widget 160 includes one or more time indicators 162. The time-lapse data object 158 is further described below with reference to FIG. 6. In an embodiment, the dialog 154 and/or the time-lapse widget 160 may include data and logic, which (when executed or interpreted) displays the data, as further described below with reference to FIGS. 2, 3, 4, and 5. In another embodiment, the dialog 154 and/or the time-lapse widget 160 may include data and control tags, which when interpreted by an unillustrated browser, presentation manager, or other application displays the data, as further described below with reference to FIGS. 2, 3, 4, and 5.

As described herein, and as is common in the art, the terms "dialog" and "widget" are units of the graphical user interface that allow the user to interface with an application, which in an embodiment is the time-lapse controller 150. Widgets and dialogs display information and/or invite the user to act. The terms dialog and widgets also refer to the logic, statements, or instructions that, when interpreted or executed, make the graphic widget and dialog in the GUI look and perform in a specified way. Context makes the usage clear. Further, the term "dialog" refers to any appropriate screen unit, such as a window, a frame, a view, or any other appropriate screen unit whether interactive or display only and whether transitory or long lasting.

The application 156 is a source of data stored in the time-lapse data object 158 and displayed in the dialog 154. In various embodiments, the application 156 may be a system status monitor, a resource monitor, a job status monitor, a performance monitor, an accounting program, or any other application with data that changes over time. In various embodiments, the application 156 may be related to the dialog 160, control the dialog 160, or may be a third-party dialog.

In an embodiment, the time-lapse controller 150 includes instructions capable of executing on the processor 101 or statements capable of being interpreted by instructions executing on the processor 101 to perform the functions as further described below with reference to FIGS. 7, 8, 9, 10, and 11. In another embodiment, the time-lapse controller 150 may be implemented in microcode. In another embodiment, the time-lapse controller 150 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/Output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 and the network 130 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
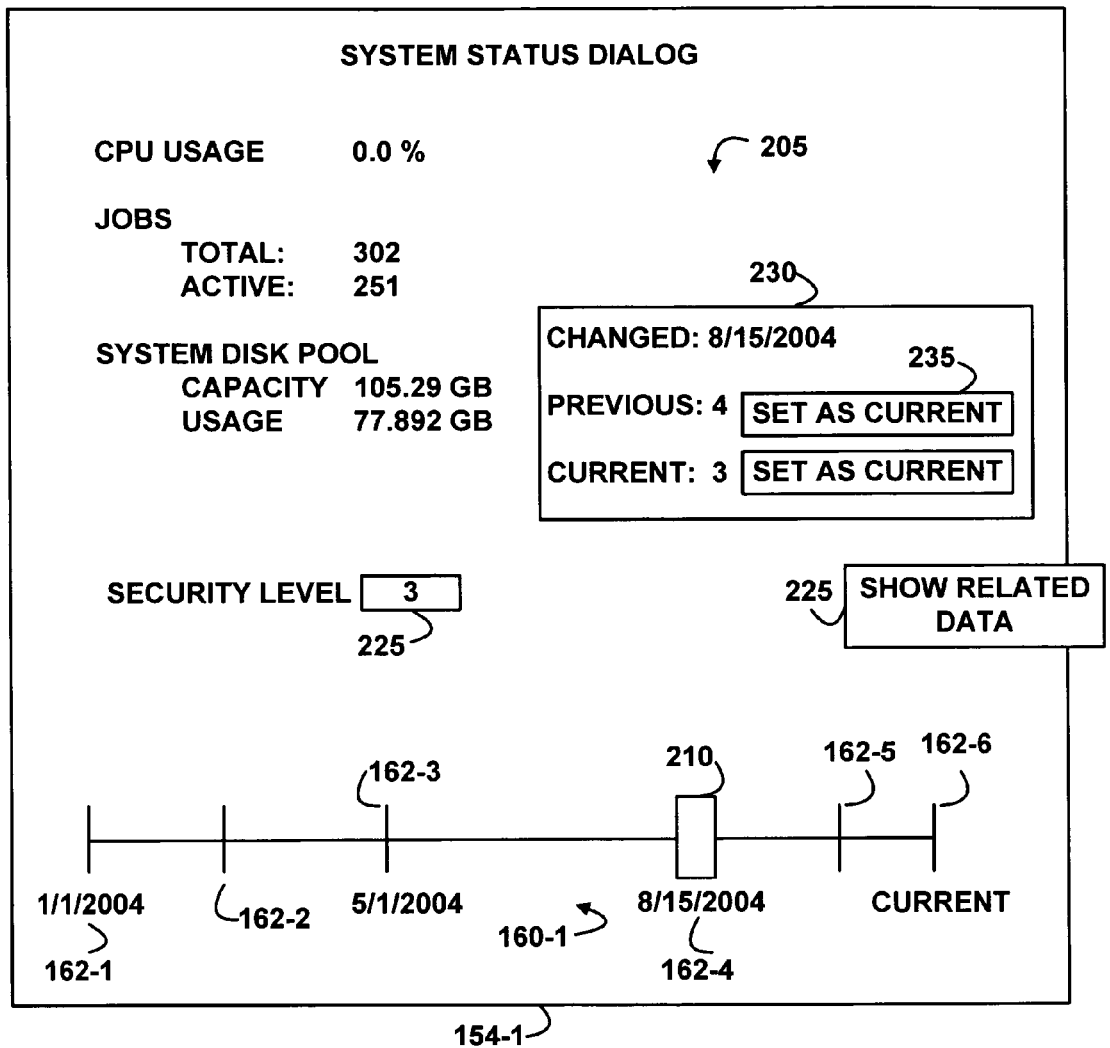
FIG. 2 depicts a pictorial representation of a user interface for an example dialog with a time-lapse widget, according to an embodiment of the invention.

FIG. 2 depicts a pictorial representation of a user interface for an example dialog 154-1 with a time-lapse widget 160-1, according to an embodiment of the invention. The example dialog 154-1 may be displayed on one or more of the terminals 121, 122, 123, and 124. The dialog 154-1 is an example of the dialog 154 (FIG. 1), and the time-lapse widget 160-1 is an example of the time-lapse widget 160 (FIG. 1).

The time-lapse widget 160-1 is illustrated with time indicators 162-1, 162-2, 162-3, 162-4, 162-5, and 162-6, which are examples of the time indicator 162 (FIG. 1). Associated with each of the time indicators 162-1, 162-2, 162-3, 162-4, 162-5, and 162-6 is a respective time and/or date, which may be, but need not be, displayed on the time-lapse widget 160-1. The time-lapse widget 160-1 also includes a slider 210. As the slider 210 moves to various of the time indicators 162-1, 162-2, 162-3, 162-4, 162-5, and 162-6, the dialog 154-1 displays data 205 that corresponds to the respective times and emphasizes or otherwise highlights the data that changed at that time.

For example, FIG. 2 shows the slider 210 at a position on the time-lapse widget 160-1 that corresponds to the time indicator 162-4, which has an associated time of "Aug. 15, 2004." Thus, the security level data 225 of "3" corresponds to the time of "Aug. 15, 2004," and is emphasized by a rectangle drawn around it to indicate that the security level 225 changed at that time. In other embodiments, any appropriate type of highlight, color, reverse video, or icon may be used to draw attention to or emphasize the changed data. As a further example, if the slider 210 is moved to the time indicator 162-3, the dialog 205 changes the security level 225 to correspond to the different time of "May 1, 2004." Hence, by moving the slider 210 to different time indicators, the user can view the security level of a computer system, for example, at different times. Further, the number of time indicators 162 corresponds to the number of times that the data was changed. The rest of the data 205 also corresponds to the time indicator 162-4, and some or all of the rest of the data 205 may change to other values as the slider 210 moves from time indicator to time indicator.

In response to a pointer or cursor moving or hovering over one of the time indicators 162, e.g., the time indicator 162-4, a hover dialog 230 is displayed, which includes such data as the current value of data, and a previous value, which represents the data at the previous time indicator (time indicator 162-3 in this example). The hover dialog 230 may also indicate that the data was changed at the time associated with the position of the slider 210 on the time-lapse widget 160-1, which is "Aug. 15, 2004," in this example. The hover location has a type, indicating the type of data displayed. In another embodiment, the hover dialog 230 may include additional data, such as the originator of the changed data or any other appropriate data. The hover dialog 230 includes a set-as-current command 235, which if selected, causes the current value at the associated time to be changed to the previous value.

Figure 3:
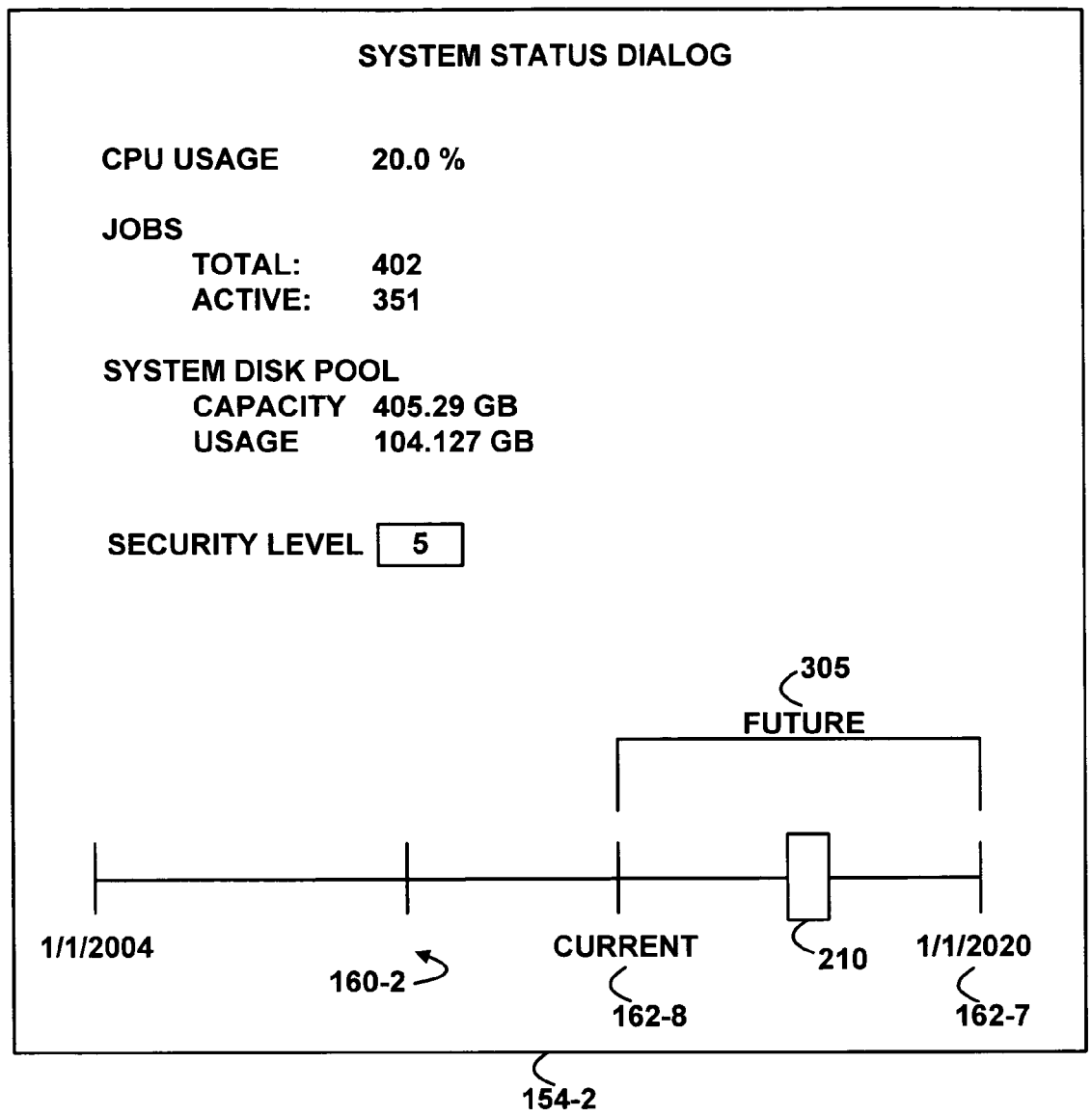
FIG. 3 depicts a pictorial representation of a user interface for an example dialog with a time-lapse widget showing future data, according to an embodiment of the invention.

Also illustrated in FIG. 2 is a show related data command 225, which after selection causes dialogs related to the current dialog 154-1 to be displayed with their respective sliders locked in concert, as further described below with reference to FIG. 5. FIG. 3 depicts a pictorial representation of a user interface for a dialog 154-2 with a time-lapse widget 160-2 showing future data, according to an embodiment of the invention. The example dialog 154-2 may be displayed on one or more of the terminals 121, 122, 123, and 124. The dialog 154-2 is an example of the dialog 154 (FIG. 1), and the time-lapse widget 160-2 is an example of the time-lapse widget 160 (FIG. 1). The time-lapse widget 160-2 is not only capable of controlling the display of historical data, but may also control the display of future data, as illustrated by a time indicator 162-7, which is subsequent to the time indicator 162-8 representing the current time. The time-lapse widget 160-2 also illustrates a future indication 305, which draws attention to the fact that when the slider 210 is within the future time period, the data being displayed in the dialog 154-2 is future data. The time-lapse widget 160-2 having future data may be used for those applications 156 that, e.g., make projections, estimates, or forecasts. In an embodiment, the time-lapse widget 160-2 may also be used by standard dialogs that then receive forecasted data from third-party applications. For example, an operating system dialog may request a third-party application for a forecast of memory usage, receive the forecast, and display the forecasted or future data in a standard operating system dialog. Hence, in various embodiments, the historical data and the future data may originate from the same application or from different applications.

Figure 4:
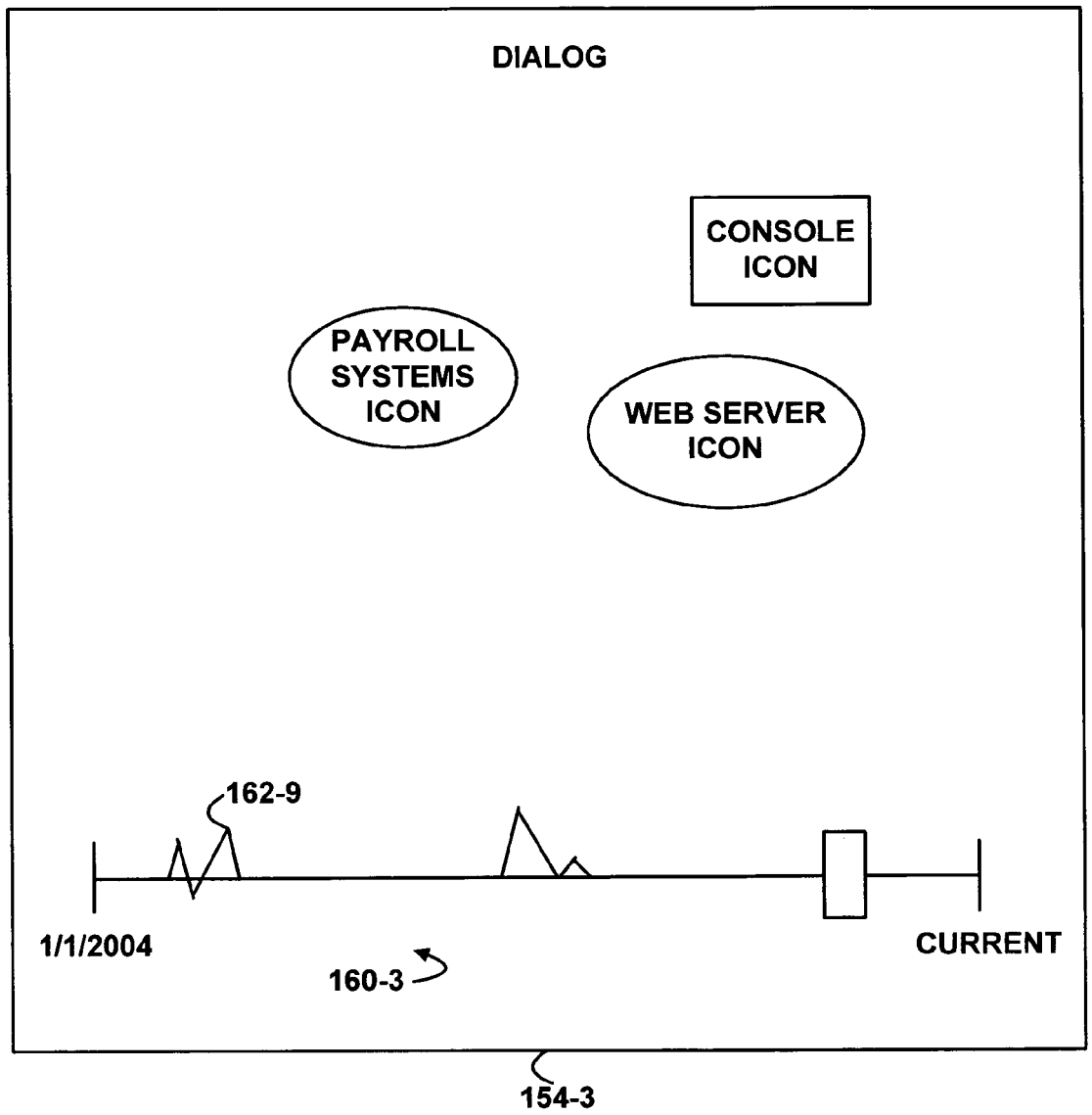
FIG. 4 depicts a pictorial representation of a user interface for an example dialog with a time-lapse widget having a ranking timeline, according to an embodiment of the invention.

FIG. 4 depicts a pictorial representation of a user interface for a dialog 154-3 with a time-lapse widget 160-3 having a ranking timeline, according to an embodiment of the invention. The example dialog 154-3 may be displayed on one or more of the terminals 121, 122, 123, and 124. The dialog 154-3 is an example of the dialog 154 (FIG. 1), and the time-lapse widget 160-3 is an example of the time-lapse widget 160 (FIG. 1). The time-lapse widget 160-3 includes a ranking timeline with time indicators, such as the time indicator 162-9, which illustrates the rank, importance, or intensity, or drastic nature of the change in the data at the associated time.

The ranking of changes at the time indicators 162-9 is graphically illustrated by different heights of the time indicators 162-9 or of different distances from the baseline, with different heights or distances reflecting different ranks in proportion. But in other embodiments, ranking may be illustrated via colors, brightness, or any other appropriate icon or indicator. The application 156 may define the meaning of the rank. In the example illustrated in FIG. 4, a very drastic change with a high time indicator may mean that the entire web server was stopped, was started, or had a catastrophic error, while a minor change with a low time indicator may mean that a node was moved within the web server. In various embodiments, a time-indicator 162-9 with ranking may be used for historical data, future data, or any other type of data. The ranking time-indicator 162-9 allows the user to easily see the time at which the important changes occurred and to access information about those changes. Since, in an embodiment, minor changes occur frequently while major changes often occur infrequently, the ranking time-indicator 169-2 cuts through the clutter of the minor changes to bring focus to the major changes.

Figure 5:
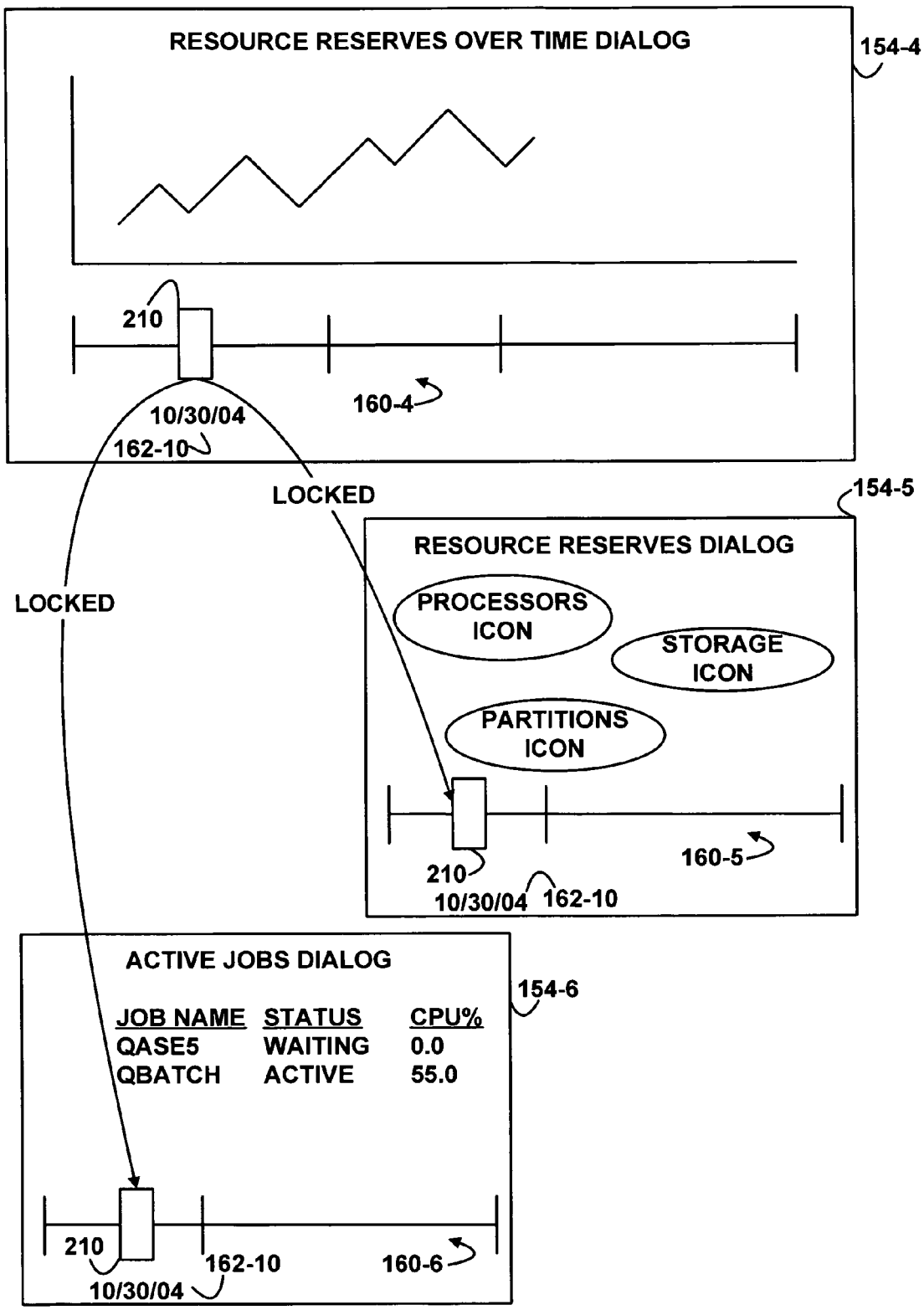
FIG. 5 depicts a pictorial representation of a user interface for example dialogs with time-lapse widgets having locked sliders, according to an embodiment of the invention.

FIG. 5 depicts a pictorial representation of a user interface for related dialogs 154-4, 154-5, and 154-6 with respective time-lapse widgets 160-4, 160-5, and 160-6 having locked sliders 210, according to an embodiment of the invention. The example dialogs 154-4, 154-5, and 154-6 may be displayed on one or more of the terminals 121, 122, 123, and 124. The dialogs 154-4, 154-5, and 154-6 are examples of the dialog 154 (FIG. 1), and the time-lapse widgets 160-4, 160-5, and 160-6 are examples of the time-lapse widget 160 (FIG. 1). In response to a show related data command (as previously described above with reference to FIG. 2) initiated from the dialog 154-4, the time-lapse controller 150 searches for data related to the data displayed in the dialog 154-4, and the related data is then displayed in the dialogs 154-5 and 154-6, as further described below with reference to FIG. 10.

The sliders 210 in the time-lapse widgets 160-4, 160-5, and 160-6 are locked, meaning that all of the sliders 210 in the time-lapse widgets 160-4, 160-5, and 160-6 are positioned at the same time indicator 162-10 (in this example the associated time is "Oct. 30, 2004"), so that the data displayed in all of the dialogs 154-4, 154-5, and 154-6 are all associated with the same time. Further, in response to one of the sliders in one of the dialogs 154-4, 154-5, and 154-6 moving, the other sliders 210 in the other time-lapse widgets also move. Locking the sliders 210 in the various dialogs enables display of the changing of related data in different dialogs at the same time, so that the relationship of the related data can be more easily seen. Locking the sliders 210 may also be helpful when scrolling future data, e.g., when multiple applications forecast different aspects of the operating system. By locking the dialogs together, the different forecasts can be correlated and viewed together.

FIG. 6 depicts a block diagram of an example data structure for the time-lapse data object 158, according to an embodiment of the invention. The time-lapse data object 158 includes records 605, 610, and 612, but in other embodiments any number of records with any appropriate data may be present. Each of the records 605, 610, and 612 includes a timestamp field 615, a previous value field 620, a current value field 625, a user field 630, a rank field 635, a type field 640, and a related field 645.

The timestamp field 615 indicates the date and/or time at which the data in the previous field 620 was changed to the data in the current value field 625. The timestamp field 615 may indicate historical dates/times or future dates/times, and future dates/times may be used with any appropriate data and type of data. The timestamp field 615 is associated with a particular time indicator 162 when displayed on the time-lapse widget 160. The previous value field 620 includes data from a previous time indicator 162 that corresponds to a record having a previous timestamp field 615, which can be changed to via the set-as-current command 235 if the field identified in the type 640 is editable, as previously described above with reference to FIG. 2. The current value field 625 includes data associated with the time indicator 162 that corresponds to the timestamp field 615.

The user field 630 identifies a user that created, changed, or is otherwise associated with the data in the current value field 625. The rank field 635 indicates the rank, importance, or significance of the change from the previous value 620 to the current value 625. The rank field 635 is used to create the ranking time indicator 162-9, as previously described above with reference to FIG. 4, but any appropriate value in the rank field 635 may be used for any appropriate data and type of data.

The type field 640 indicates the type of the data indicated in the previous value 620 and the current value 625 and may also include an identification of the dialog 154 in which the data is to be displayed. The type 640 may be any appropriate type with any appropriate format for the data. For example, the data may be formatted as a list view; a tree view of folders, sub-folders, directories, sub-directories, and files; a table having columns and rows; an icon view; a three-dimensional view; a graphical view; a grid; a property sheet; a pie chart; or any other appropriate format. The data may further include images, audio, video, text, or any other appropriate data.

The related field 645 identifies a type of data that is related to the type 640 and may also include an identification of a related dialog 154 in which the related type is displayed. The related field 645 may be used to find related data to concurrently display with locked sliders 210, as previously described above with reference to FIG. 5.

Using the example dialog 154-1 of FIG. 2, the record 610 includes a timestamp 615 of "May 1, 2004," which corresponds to the time indicator 162-3. The record 610 further includes a previous value 620 of "94.127," which is the previous value of the usage at a time associated with a previous time-indicator, such as the time-indicator 162-2. The record 610 further includes a current value 625 of "77.892," which is displayed in the dialog 154-1 as the usage. The record 610 further includes a user 630 of "User A," which identifies the user associated with the change that was made on "May 1, 2004" from the previous value 620 to the current value 625. The record 610 further includes a rank 635 of "0," indicating a baseline rank for the time indicator 162-4 in the dialog 154-1, but in other embodiments any appropriate value may be used to indicate a baseline rank and any appropriate rank scale may be used. The record 610 further includes a type 640 of "system disk pool," which indicates the type of the data in the previous value field 620 and the current value field 625. The record 610 further includes a related value 645 of "resource reserves," which indicates that a record having a type of "resource reserves," such as the record 605, contains data that is related to the data in the record 610.

Again using the example dialog 154-1 of FIG. 2, the record 612 includes a timestamp 615 of "Aug. 15, 2004," which corresponds to the time indicator 162-4. The record 612 further includes a previous value 620 of "4," which is the previous value in the hover dialog 230 that is returned to in response to selection of the set-as-current command 235. The record 612 further includes a current value 625 of "3," which is displayed in the dialog 154-1 as the security level and is also included in the hover dialog 230 as the current value. The record 612 further includes a type 640 of "security level," which indicates the type of the data in the previous value field 620 and the current value field 625.

Figure 7:
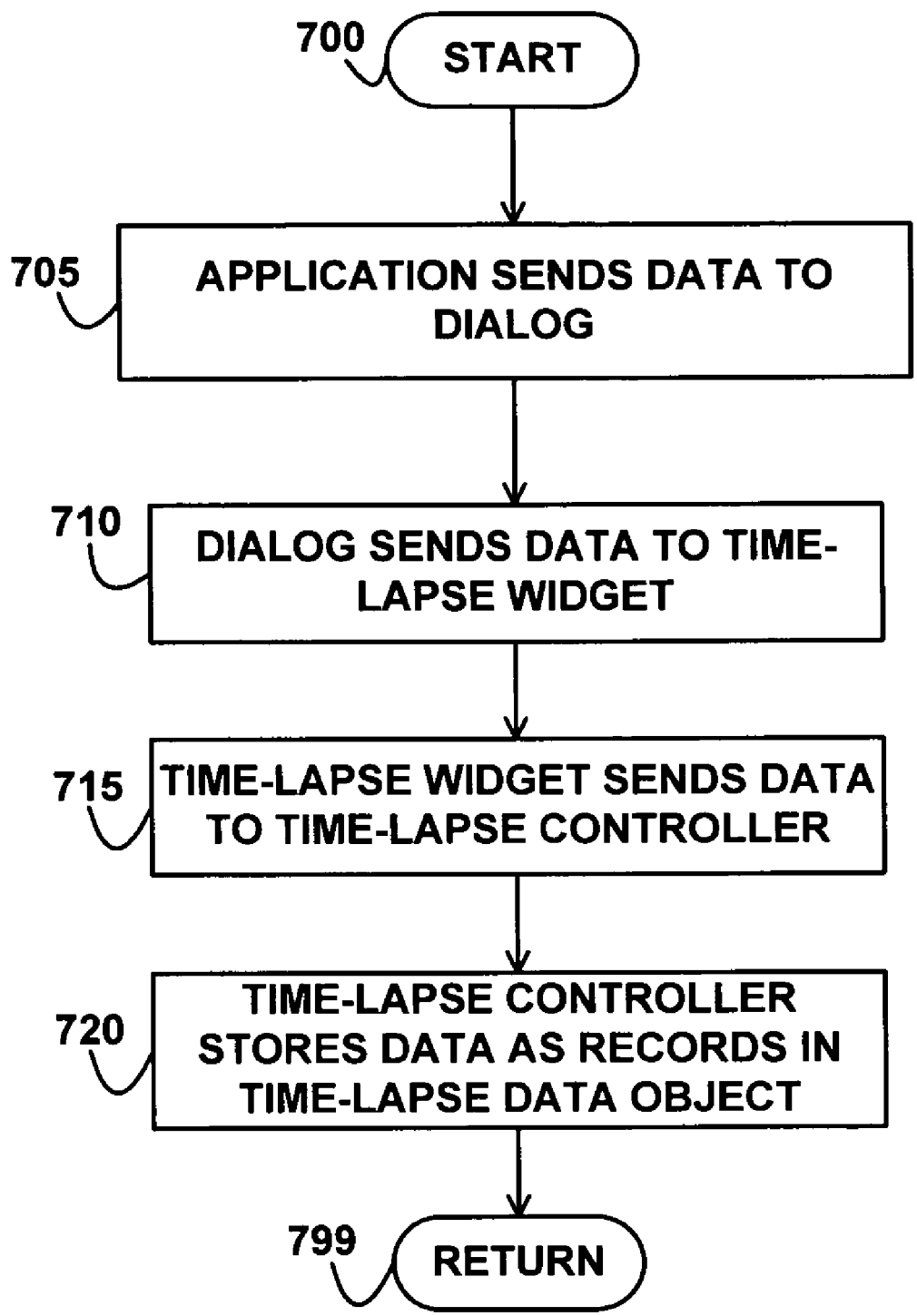
FIG. 7 depicts a flowchart of example processing for receiving data from an application and storing the data in the time-lapse data object, according to an embodiment of the invention.

FIG. 7 depicts a flowchart of example processing for receiving data from the application 156 and storing the data in the time-lapse data object 158, according to an embodiment of the invention. Control begins at block 700. Control then continues to block 705 where the application 156 sends data to the dialog 154. Control then continues to block 710 where the dialog 154 sends the data to the time-lapse widget 160. Control then continues to block 715 where the time-lapse widget 160 sends the data to the time-lapse controller 150. Control then continues to block 720 where the time-lapse controller 150 stores the data as records in the time-lapse data object 158, as previously described above with reference to FIG. 6.

Figure 8:
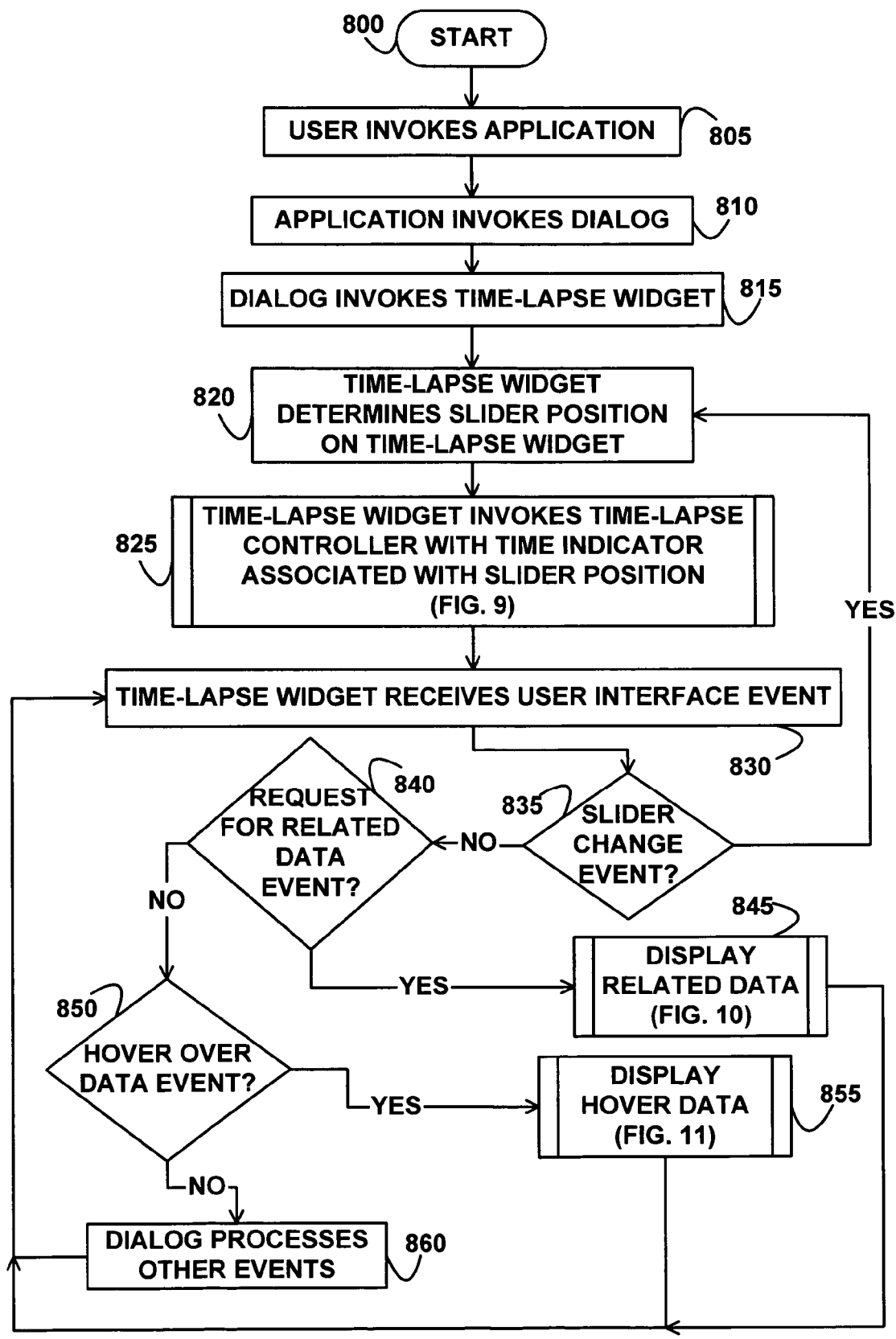
FIG. 8 depicts a flowchart of example processing for extracting data from the time-lapse data object and displaying the data via the dialog and the time-lapse widget, according to an embodiment of the invention.

FIG. 8 depicts a flowchart of example processing for extracting data from the time-lapse data object 158 and displaying the data via the dialog 154 and the time-lapse widget 160, according to an embodiment of the invention. Control begins at block 800. Control then continues to block 805 where a user invokes the application 156. In another embodiment, the application 156 may be invoked from another program or via any appropriate means.

Control then continues to block 810 where the application 156 invokes the dialog 154. Control then continues to block 815 where the dialog 154 displays the data associated with the dialog 154 and invokes the time-lapse widget 160. Control then continues to block 820 where the time-lapse widget 160 displays the data associated with the time-lapse widget 160 and determines the position of the slider 210 on the time-lapse widget 160. The slider 210 may have an initial or default position on the time-lapse widget 160 if the slider 210 has not yet been moved. Control then continues to block 825 where the time-lapse widget 160 invokes the time-lapse controller 150 and passes the time indicator 162 associated with the position of the slider 210, in order to display data associated with the time indicator 162, as further described below with reference to FIG. 9.

Control then continues to block 830 where the time-lapse widget 160 receives a user interface event. Control then continues to block 835 where the time-lapse widget 160 determines whether the received user interface event indicates that the position of the slider 210 has changed on the time-lapse widget 160 to a different time indicator 162.

If the determination at block 835 is true, then the position of the slider 210 has changed on the time-lapse widget 160, so control returns from block 835 to block 820, as previously described above.

If the determination at block 835 is false, then the position of the slider 210 has not changed on the time-lapse widget 160, so control continues from block 835 to block 840 where the time-lapse widget 160 determines whether the received event indicates a request for related data, as initiated, e.g., via the user interface element 225. If the determination at block 840 is true, then the received event indicates a request for related data, so control continues to block 845 where the related data is displayed, as further described below with reference to FIG. 10. Control then returns to block 830, as previously described above.

If the determination at block 840 is false, then the received event is not a request for related data, so control continues from block 840 to block 850 where the time-lapse widget 160 determines whether the received event indicates a hover event, as previously described above with reference to FIG. 2. If the determination at block 850 is true, then the event is a hover event, so control continues from block 850 to block 855 where hover data 230 is displayed, as further described below with reference to FIG. 11. Control then returns to block 830, as previously described above.

If the determination at block 850 is false, then the event is not a hover event, so control continues to block 860 where the dialog 154 processes other events. Control then returns to block 830, as previously described above.

Figure 9:
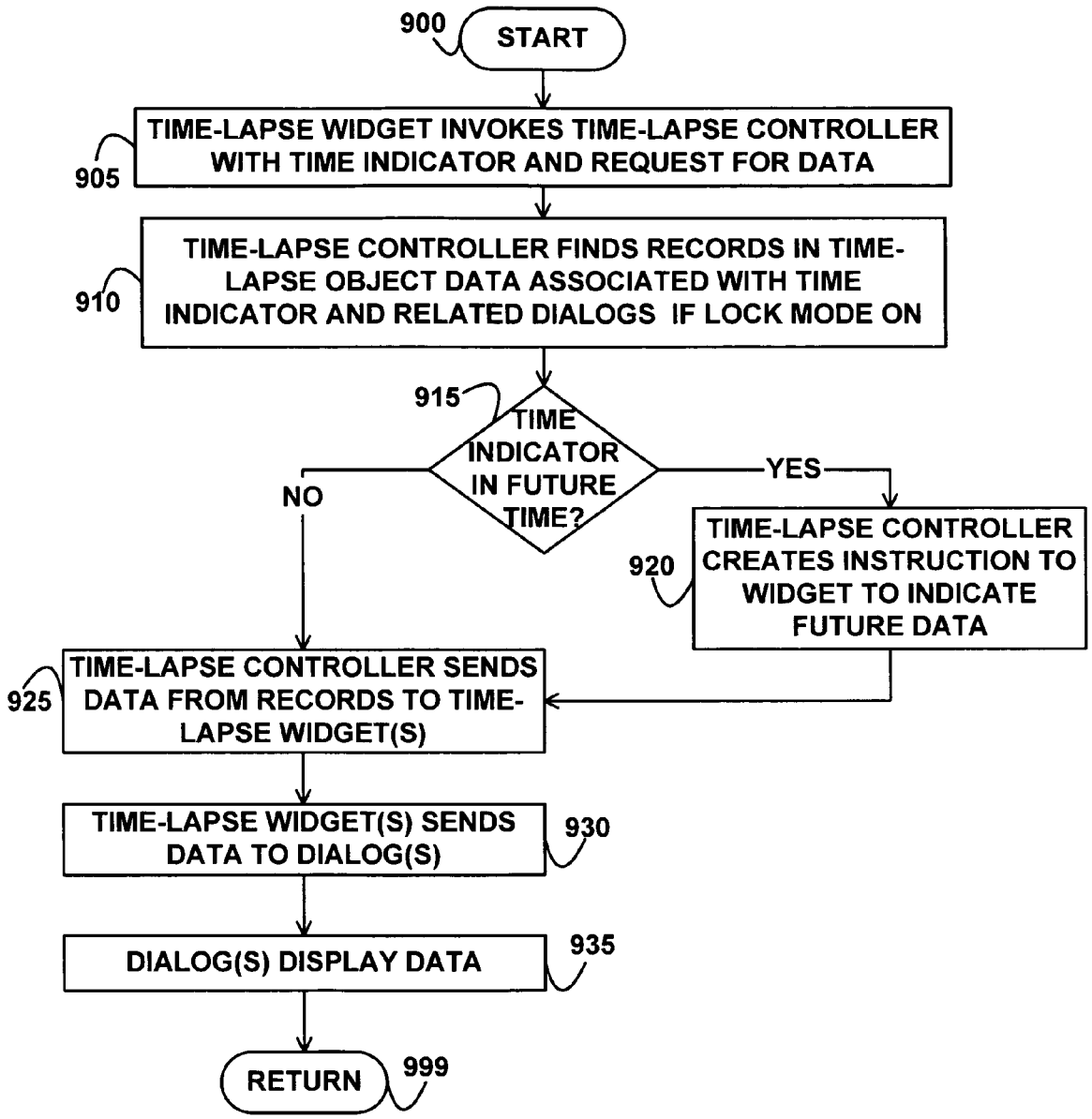
FIG. 9 depicts a flowchart of example processing for updating the dialog in response to a change to the time-lapse widget, according to an embodiment of the invention.

FIG. 9 depicts a flowchart of example processing for updating the dialog 154 in response to a change to the time-lapse widget 160, according to an embodiment of the invention. Control begins at block 900. Control then continues to block 905 where the time-lapse widget 160 invokes the time-lapse controller 150 and passes the time indicator 162 associated with the current position of the slider 210 and a request for data associated with the time indicator 162. Control then continues to block 910 where the time-lapse controller 150 finds a record or records in the time-lapse object data 158 associated with the passed time indicator 162. If lock mode is on, then the time-lapse controller 150 also finds data associated with related dialogs and other applications (related dialogs were previously described above with reference to FIG. 5). In various embodiments, the applications may provide historical or future/projected/forecasted data, and the applications may be associated with the dialog 154 or may be third-party applications. The processing of block 910 is analogous to the processing of block 1015, as further described below with reference to FIG. 10).

Control then continues to block 915 where the time-lapse controller 150 determines whether the time indicator 162 is in future time, i.e., the time indicator 162 associated with the current position of the slider 210 is later than the current time. If the determination at block 915 is true, then the time indicator 162 is in future time, so control continues to block 920 where the time-lapse controller 150 sends an instruction to the time-lapse widget 160 requesting the time-lapse widget 160 to indicate future data, e.g., via the future indication 305, as previously described above with reference to FIG. 3.

Control then continues to block 925 where the time-lapse controller 150 sends data from the found records to the time-lapse widget 160 or the time-lapse widgets 160, in the case of related dialogs. Control then continues to block 930 where the time-lapse widget(s) 160 send the data to the dialog(s) 154. Control then continues to block 935 where the dialog(s) 154 display the data. Control then continues to block 999 where the logic of FIG. 9 returns.

If the determination at block 920 is false, then the time indicator 162 is not in future time, so control continues from block 915 to block 925, as previously described above.

Figure 10:
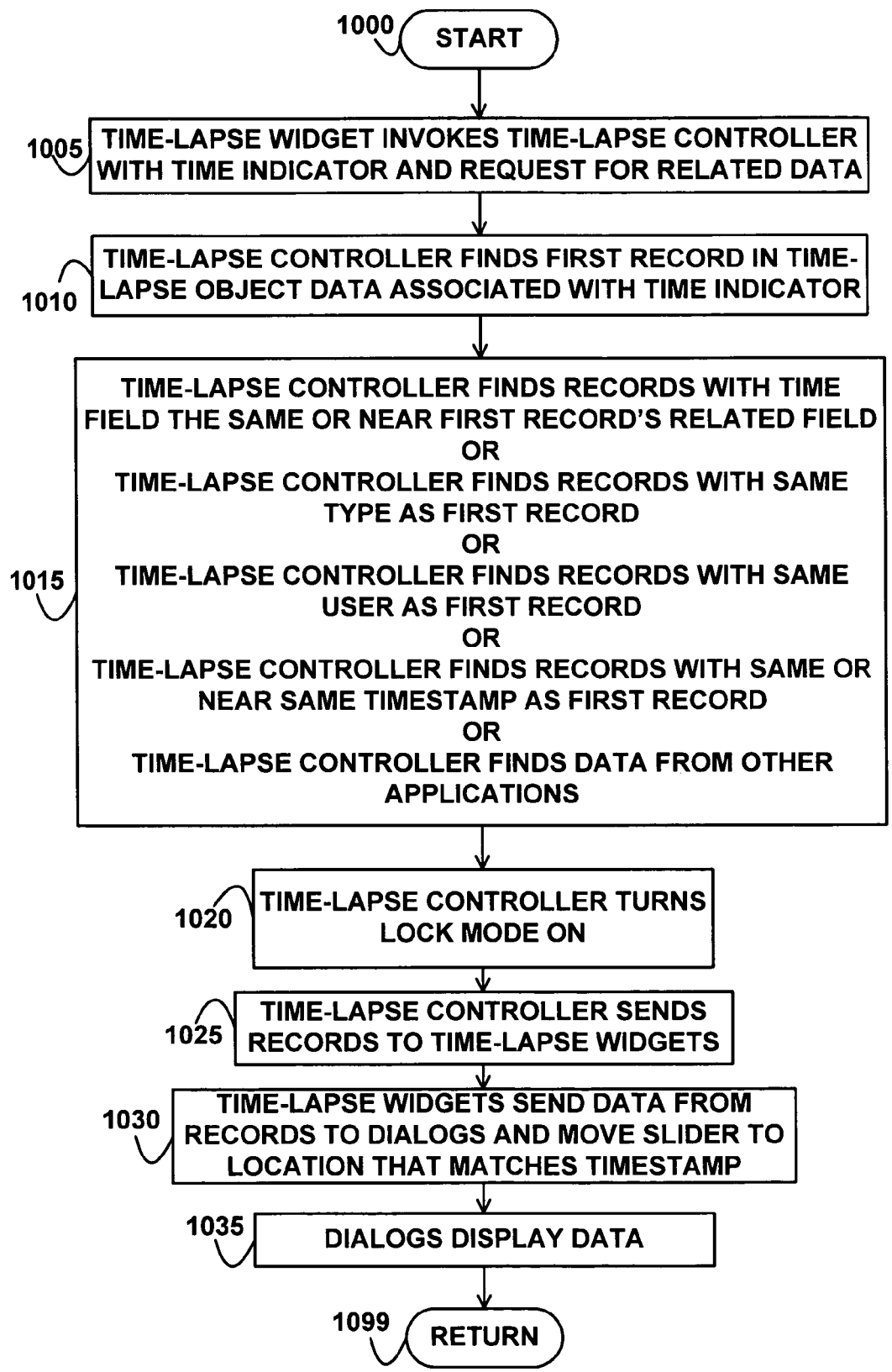
FIG. 10 depicts a flowchart of example processing for displaying related dialogs with locked sliders in time-lapse widgets, according to an embodiment of the invention.

FIG. 10 depicts a flowchart of example processing for displaying related dialogs 154 with locked sliders 210 in the time-lapse widgets 160, according to an embodiment of the invention. Control begins at block 1000. Control then continues to block 1005 where the time-lapse widget 160 invokes the time-lapse controller 150 and passes the time indicator 162 associated with the current position of the slider 210 and a request for related data. Control then continues to block 1010 where the time-lapse controller 150 finds the first record in the time-lapse object data 158 associated with the time indicator 162.

Control then continues to block 1015 where the time-lapse controller 150 retrieves records and/or data related to the first record. In an embodiment, the time-lapse controller 150 retrieves records that have a type field 640 that matches the related field 645 of the first record. In another embodiment, the time-lapse controller 150 finds records with the same type field 640 as the first record. In another embodiment, the time-lapse controller 150 finds records with the same user field 630 as the first record. In an other embodiment, the time-lapse controller 150 finds records with the same timestamp 615 (or near, e.g., within a threshold of the timestamp) as the first record. In another embodiment, the time-lapse controller 150 finds data from other applications via an application plug-in. For example, the time-lapse controller 150 may scan performance data from performance applications or management data from management applications. In an embodiment, the user may specify a filter that the time-lapse controller 150 uses to find records or to find dialogs. In various embodiments, the time-lapse controller 150 may find all records that have similarities or may find all records for all dialogs that have at least one record with a similarity.

Control then continues to block 1020 where the time-lapse controller 150 turns lock mode on (lock mode was previously checked at block 910). Control then continues to block 1025 where the time-lapse controller 150 sends the found records to their respective time-lapse widgets 160 (e.g., the time-lapse widgets 160-4, 160-5, and 160-6, as previously described above with reference to FIG. 5). Control then continues to block 1030 where the time-lapse widgets 160 send the data from the records to their respective dialogs 154. The time-lapse widgets 160 also move their respective sliders to a location that matches the timestamp field 615 in their records.

Control then continues to block 1035 where the dialogs 154 (e.g., the dialogs 154-4, 154-5, and 154-6 of FIG. 5) display their respective data. Control then continues to block 1099 where the logic of FIG. 10 returns.

Figure 11:
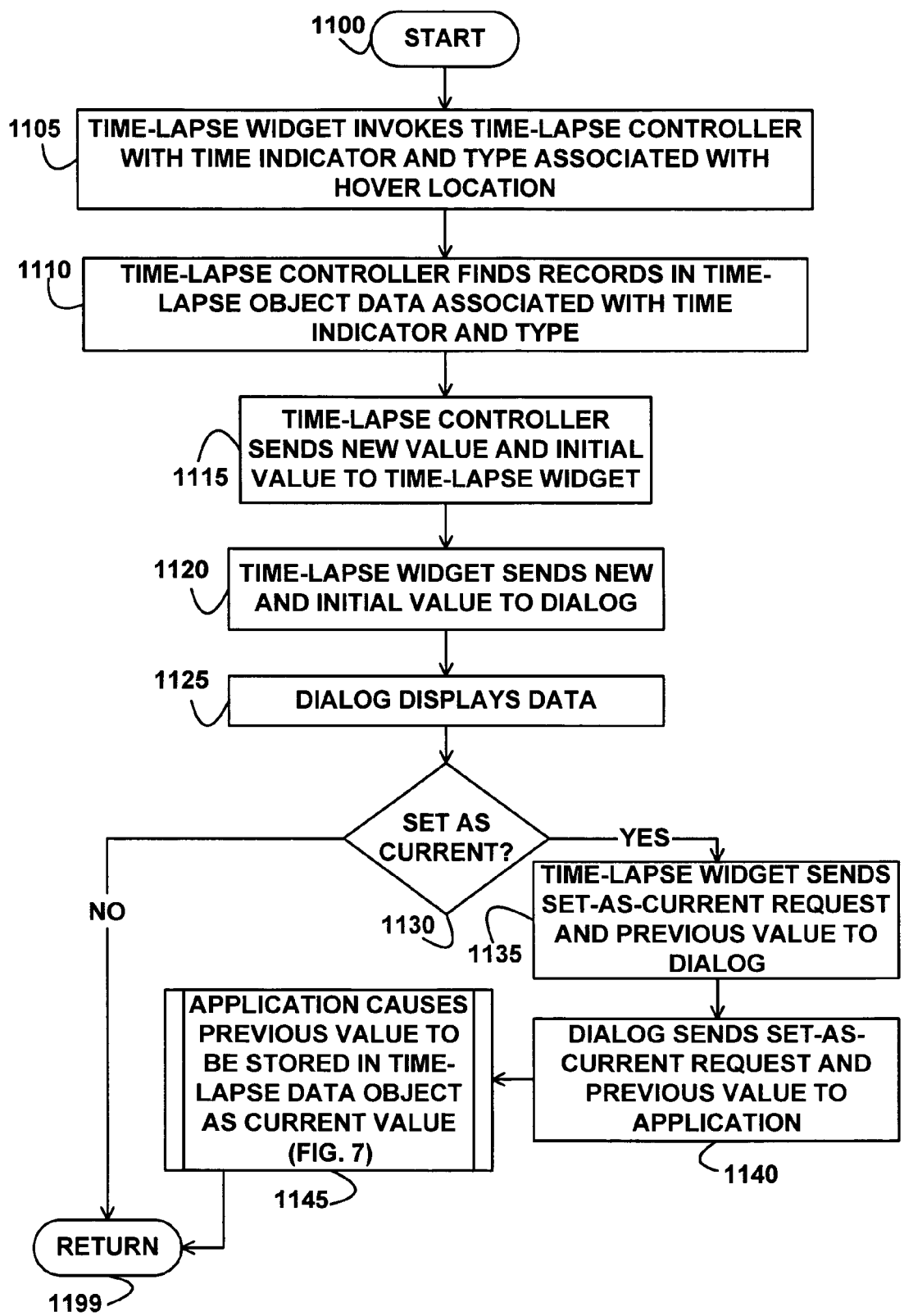
FIG. 11 depicts a flowchart of example processing for displaying hover data and processing a set-as-current function, according to an embodiment of the invention.

FIG. 11 depicts a flowchart of example processing for displaying hover data and processing a set-as-current function, according to an embodiment of the invention. Control begins at block 1100. Control then continues to block 1105 where the time-lapse widget 160 invokes the time-lapse controller 150 and passes the time indicator 162 associated with the current location of the slider 210 and the type associated with the hover location, as previously described above with reference to FIG. 2. Control then continues to block 1110 where the time-lapse controller 150 finds records in the time-lapse data object 158 associated with the passed time indicator and type. Control then continues to block 1115 where the time-lapse controller 150 retrieves the previous value 620 and current value 625 from the found record and sends them to the time-lapse widget 160. Control then continues to block 1120 where the time-lapse widget 160 sends the previous and current values to the dialog 154. Control then continues to block 1125 where the dialog 154 displays the previous and current values, e.g., in the hover dialog 230, as previously described above with reference to block FIG. 2.

Control then continues to block 1130 where the time-lapse widget 160 determines whether a set-as-current command 235 (FIG. 2) is requested. If the determination at block 1130 is true, then a set-as-current command is requested, so control continues to block 1135 where the time-lapse widget 160 sends the set-as-current request and the previous value to the dialog 154. Control then continues to block 1140 where the dialog 154 sends the set-as-current request and the previous value to the application 156. Control then continues to block 1145 where the application 156 causes the previous value to be stored in the current value 625 of the appropriate record in the time-lapse data object 158, as previously described above with reference to FIG. 7. Control then continues to block 1199 where the logic of FIG. 11 returns.

If the determination at block 1130 is false, then a set-as-current function is not requested, so control continues to block 1199 where the logic of FIG. 11 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A method comprising:
 displaying a time-lapse widget comprising a plurality of time indicators, wherein each of the plurality of time indicators indicates a respective time and represents a relative ranking of changes to data associated with the plurality of time indicators, wherein each of the plurality of time indicators has a size proportional to the relative ranking of the changes to the data, wherein the relative ranking of the changes to the data comprises a relative importance of the changes to the data at the respective times, and wherein a number of the plurality of time indicators corresponds to a number of times that the data was changed;

changing display of the data associated with each of the plurality of time indicators in response to a slider moving over the plurality of time indicators;

displaying an current value and a previous value for the data associated with one of the plurality of time indicators; and changing the current value to the previous value for the data.

2. The method of claim 1, wherein at least one of the plurality of time indicators is associated with a time prior to a current time, and the data associated with the at least one of the plurality of time indicators comprises historical data.

3. The method of claim 1, wherein at least one of the plurality of time indicators is associated with a time after the current time, and the data associated with the at least one of the plurality of time indicators comprises forecasted data.

4. The method of claim 1, further comprising:
emphasizing the data that has changed in response to the slider moving over the associated time indicator.

5. An apparatus comprising:
means for displaying a time-lapse widget comprising a plurality of time indicators, wherein each of the plurality of time indicators indicates a respective time and represents a relative ranking of changes to data associated with the plurality of time indicators, wherein each of the time indicators has a size proportional to the respective relative ranking of the changes to the data, wherein the relative ranking of the changes to the data comprises a relative importance of the changes to the data at the respective times, and wherein a number of the plurality of time indicators corresponds to a number of times that the data was changed;

means for displaying the data associated with each of the plurality of time indicators in response to a slider moving over the plurality of time indicators;

means for displaying an current value and a previous value for the data associated with one of the plurality of time indicators; and means for changing the current value to the previous value for the data.

6. The apparatus of claim 5, wherein at least one of the plurality of time indicators is associated with a time prior to a current time, and the data associated with the at least one of the plurality of time indicators comprises historical data.

7. The apparatus of claim 5, wherein at least one of the plurality of time indicators is associated with a time after the current time, and the data associated with the at least one of the plurality of lime indicators comprises forecasted data, and the forecasted data originates from a third-party application.

8. The apparatus of claim 5, further comprising:
means for emphasizing the data that has changed in response to the slider moving over the associated time indicator.

9. A storage medium encoded with instructions, wherein the instructions when executed comprise:
determining a first subset of a plurality of data items;

in response to a command to show related data, finding a second subset of the plurality of data items and determining that the second subset of the plurality of data items is related to the first subset of the plurality of data items;

displaying a first time-lapse widget comprising a first plurality of time indicators, wherein each of the first plurality of time indicators indicates a respective time and represents a first relative ranking of changes to the first subset of the plurality of data items associated with the first plurality of time indicators, wherein each of the first plurality of time indicators has a respective first size proportional to the first relative ranking of the changes to the first subset of the plurality of data items, wherein the first relative ranking of the changes to the first subset of the plurality of data items comprises a relative importance of the changes to the first subset of the plurality of data items at the respective times, and wherein a number of the first plurality of time indicators corresponds to a number of times that the first subset of the plurality of data items was changed;

displaying a second time-lapse widget comprising a second plurality of time indicators, wherein each of the second plurality of time indicators indicates a respective time and represents a second relative ranking of changes to the second subset of the plurality of data items associated with the second plurality of time indicators, wherein each of the second plurality of time indicators has a respective second size proportional to the second relative ranking of the changes to the second subset of the plurality of data items, wherein the second relative ranking of the changes to the second subset of the plurality of data items comprises a relative importance of the changes to the second subset of the plurality of data items at the respective times, and wherein a number of the second plurality of time indicators corresponds to a number of times that the second subset of the plurality of data items was changed;

moving a first slider on the first time-lapse widget and moving a second slider on the second time-lapse widget together, wherein movement of the first slider on the first time-lapse widget causes corresponding movement of the second slider on the second time-lapse widget;

displaying the first subset of the plurality of data items in a first dialog associated with the first time-lapse widget and displaying the second subset of the plurality of data items in a second dialog associated with the second time-lapse widget, wherein the plurality of data items are associated with plurality of respective positions of the first slider and the second slider, wherein each of the respective positions of the first slider is at the respective time indicators on the first time-lapse widget, and wherein each of the respective positions of the second slider is at the respective time indicators on the second time-lapse widget;

displaying an current value and a previous value for one of the plurality of data items that is in the first subset and that is associated with one of the first plurality of time indicators; and changing the current value to the previous value for the one of the plurality of data items that is in the first subset.

10. The storage medium of claim 9, wherein the finding the second subset of the plurality of data items and determining that the second subset is related to the first subset further comprises:

finding the second subset of the plurality of data items based on the one of the plurality of data items that is in the first subset.

11. The storage medium of claim 10, wherein the finding the second subset of the plurality of data items and determining that the second subset is related to the first subset further comprises:
finding the second subset of the plurality of data items based on a specification of related data.

12. The storage medium of claim 10, wherein the finding the second subset of the plurality of data items and determining that the second subset is related to the first subset further comprises:
finding the second subset of the plurality of data items based on the data items that have a same type as the one of the plurality of data items that is in the first subset.

13. A computer system comprising:
a processor; and
a storage device encoded with instructions, wherein the instructions when executed on the processor comprise:
determining a first subset of a plurality of data items,
in response to a command to show related data, finding a second subset of the plurality of data items and determining that the second subset of the plurality of data items is related to the first subset of the plurality of data items,
displaying a first time-lapse widget comprising a first plurality of time indicators, wherein each of the first plurality of time indicators indicates a respective time and represents a first relative ranking of changes to the first subset of the plurality of data items associated with the first plurality of time indicators, wherein each of the first plurality of time indicators has a respective first size proportional to the first relative ranking of the changes to the first subset of the plurality of data items, wherein the first relative ranking of the changes to the first subset of the plurality of data items comprises a relative importance of the changes to the first subset of the plurality of data items at the respective times, and wherein a number of the first plurality of time indicators corresponds to a number of times that the first subset of the plurality of data items was changed,
displaying a second time-lapse widget comprising a second plurality of time indicators, wherein each of the second plurality of time indicators indicates a respective time and represents a second relative ranking of changes to the second subset of the plurality of data items associated with the second plurality of time indicators, wherein each of the second plurality of time indicators has a respective second size proportional to the second relative ranking of the changes to the second subset of the plurality of data items, wherein the second relative ranking of the changes to the second subset of the plurality of data items comprises a relative importance of the changes to the second subset of the plurality of data items at the respective times, and wherein a number of the second plurality of time indicators corresponds to a number of times that the second subset of the plurality of data items was changed,
moving a first slider on the first time-lapse widget and moving a second slider on the second time-lapse widget together, wherein movement of the first slider on the first time-lapse widget causes corresponding movement of the second slider on the second time-lapse widget,
displaying the first subset of the plurality of data items in a first dialog associated with the first time-lapse widget and displaying the second subset of the plurality of data items in a second dialog associated with the second time-lapse widget, wherein the plurality of data items are associated with a plurality of respective positions of the first slider and the second slider, wherein each of the respective positions of the first slider is at the respective time indicators on the first time-lapse widget, and wherein each of the respective positions of the second slider is at the respective time indicators on the second time-lapse widget,
displaying an current value and a previous value for one of the plurality of data items that is in the first subset and that is associated with one of the first plurality of time indicators, and
changing the current value to the previous value for the one of the plurality of data items tat is in the first subset.

14. The computer system of claim 13, wherein the finding the second subset of the plurality of data items and determining that the second subset is related to the first subset further comprises:
finding the second subset of the plurality of data items based on the one of the plurality of data items that is in the first subset.

15. The computer system of claim 14, wherein the finding the second subset of the plurality of data items and determining that the second subset is related to the first subset further comprises:
finding the second subset of the plurality of data items based on a specification of related data.

16. The computer system of claim 14, wherein the finding the second subset of the plurality of data items and determining that the second subset is related to the first subset further comprises:
finding the second subset of the plurality of data items based on the data items that have a same type as the one of the plurality of data items that is in the first subset.

17. The computer system of claim 14, wherein the finding the second subset of the plurality of data items and determining that the second subset is related to the first subset further comprises:
finding the second subset of the plurality of data items based the data items that are associated with a same user as the one of the plurality of data items that is in the first subset.

18. The computer system of claim 14, wherein the finding the second subset of the plurality of data items and determining that the second subset is related to the first subset further comprises:
finding the second subset of the plurality of data items based the data items that were changed at a same time as the one of the plurality of data items in the first subset.

19. The computer system of claim 14, wherein the finding the second subset of the plurality of data items and determining that the second subset is related to the first subset further comprises:
finding the second subset of the plurality of data items based the data items that were changed at a time within a threshold of the one of the plurality of data items in the fist subset.

20. A method for configuring a computer, comprising:
configuring the computer to display a time-lapse widget comprising a plurality of time indicators, wherein each of the plurality of time indicators indicates a respective time and represents a relative ranking of changes to data associated with the plurality of time indicators, wherein each of the plurality of time indicators has a size proportional to the relative ranking of the changes to the data, wherein the relative ranking of the changes to the data comprises a relative importance of the changes to the data at the respective times, and wherein a number of the plurality of time indicators corresponds to a number of times that the data was changed;

configuring the computer to display the data associated with each of the plurality of time indicators in response to a slider moving over the plurality of time indicators;

configuring the computer to display an current value and a previous value for the data associated with one of the plurality of time indicators; and configuring the computer to change the current value to the previous value for the data.

21. The method of claim 20, wherein at least one of the plurality of time indicators is associated with a time prior to a current time, and the data associated with the at least one of the plurality of time indicators comprises historical data.

22. The method of claim 20, wherein at least one of the plurality of time indicators is associated with a time after the current time, and the data associated with the at least one of the plurality of time indicators comprises forecasted data.

23. The method of claim 20, further comprising:
configuring the computer to emphasize the data that has changed in response to the slider moving over the associated time indicator.

* * * * *